(12) United States Patent
Hamada et al.

(10) Patent No.: US 7,062,633 B1
(45) Date of Patent: Jun. 13, 2006

(54) CONDITIONAL VECTOR ARITHMETIC METHOD AND CONDITIONAL VECTOR ARITHMETIC UNIT

(75) Inventors: Mana Hamada, Fukuoka (JP); Shunichi Kuromaru, Fukuoka (JP); Tomonori Yonezawa, Fukuoka (JP); Tsuyoshi Nakamura, Fukuoka (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/868,048

(22) PCT Filed: Dec. 15, 1999

(86) PCT No.: PCT/JP99/07052

§ 371 (c)(1),
(2), (4) Date: Jul. 16, 2001

(87) PCT Pub. No.: WO00/36527

PCT Pub. Date: Jun. 22, 2000

(30) Foreign Application Priority Data

Dec. 16, 1998 (JP) .................................. 10/357796

(51) Int. Cl.
G06F 9/302 (2006.01)
G06F 9/38 (2006.01)

(52) U.S. Cl. ................ 712/9; 712/221; 712/226; 708/521; 708/525

(58) Field of Classification Search ........ 712/2, 712/9, 221, 25, 222, 223, 226; 708/603, 708/714, 233, 507, 508, 521, 525
See application file for complete search history.

(56) References Cited

U.S. PATENT DOCUMENTS 4,128,880 A 12/1978 Cray, Jr. .................. 364/200

4,924,422 A * 5/1990 Vassiliadis et al. .......... 708/210
5,247,696 A * 9/1993 Booth ........................ 717/150
5,617,486 A * 4/1997 Chow et al. ................ 382/181

FOREIGN PATENT DOCUMENTS

JP 59-58580 4/1984
JP 60-207967 10/1985
JP 8-305563 11/1996

OTHER PUBLICATIONS

T. Araki te al., "The Architecture of a Vector Digitial Signal Processor for Video Coding," Digital Signal Processing 2, Estimation, VLSI, San Francisco, Mar. 23, 1992, vol. 5 Conf. 17, pp. 681-684.

J. Hannessy et al., "Computer Architecture—A Quantative Approach," Morgan Kaufmann, XP002297069, 1990, pp. 251-252.

M. Toyokura et al., "A Video Digital Signal Processor with a Vector-Pipeline Architecture," IEEE International Solid-State Circuits Conference, New York, Feb. 1992, XP000315769, ISSN: 0193-8530, vol. 35, pp. 72-72, 248.

K. Aono et al., "A Video Digital Signal Processor with a Vector-Pipeline Architecture," IEEE Journal of Solid-State Circuits, New York, Dec. 1, 1992, XP000329041, ISSN: 0016-9200, vol. 27, No. 12, pp. 1888-1894.

* cited by examiner

Primary Examiner—Daniel H. Pan
(74) Attorney, Agent, or Firm—Parkhurst & Wendel, L.L.P.

(57) ABSTRACT

It is decided whether a first source data from the memory 101 is a data which is to be subjected to arithmetic or not by a state flag detection means 150, the result of the decision is retained as a state flag, and it is decided by a condition decision means 109 whether or not the state flag satisfies a condition for performing the arithmetic. A control means 110 controls whether an ALU 100 should perform the arithmetic or not on the basis of the condition satisfaction/dissatisfaction information.

4 Claims, 5 Drawing Sheets

CONDITIONAL VECTOR ARITHMETIC METHOD AND CONDITIONAL VECTOR ARITHMETIC UNIT

TECHNICAL FIELD

The present invention relates to a conditional vector arithmetic method and a conditional vector arithmetic unit and, more particularly, to an arithmetic method for performing arithmetic to vector instructions or conditional arithmetic instructions which are prepared for an instruction set to be mounted on a processor which is called a microprocessor, a digital signal processor (hereinafter, referred to as DSP) or the like, or a data processor, and an improved arithmetic unit which performs arithmetic with using the arithmetic method.

BACKGROUND ART

FIG. 4 is a flowchart showing a case where arithmetic target data are subjected to a processing which differs according to whether the arithmetic target data satisfies a certain condition or not as for, for example whether the arithmetic target data is zero, with using a data processor including a general-purpose instruction set, such as a microprocessor and a DSP, or a semiconductor integrated circuit apparatus which is called a system LSI in which such a data processor is mounted.

In this FIG. 4, initially in step S401, an arithmetic target data 402 is obtained. Then, in step S403, a process for comparing the data 402 which has been obtained in the previous step S401 with zero is carried out to confirm that the data 402 is zero or not.

In the subsequent step S404, upon receipt of the result of the previous step S403, when the comparison result shows noncoincidence (No), the operation proceeds to step S406 to carry out a process B. On the other hand, when the decision result in step S404 shows coincidence (Yes), the arithmetic target data 402 is subjected to a process A in step S405, and thereafter the operation proceeds to step S406.

Here, assume that the process B is a process using the arithmetic target data, or a data which is obtained by subjecting the arithmetic target data to the arithmetic of the process A.

As described above, in the flowchart of FIG. 4, according to the execution result of step S404, the following processing procedure, i.e., the flow of data processing differs.

One of the instructions which are included as the general-purpose instruction set in the common processors which are called microprocessors, DSPs or the like is a conditional branch instruction. According to the conditional branch instruction, a code which is called a condition code having information which indicates the property of an arithmetic result is previously generated and retained in an arithmetic instruction to be executed, and when this condition code coincides with a condition which is specified by the conditional branch instruction, the condition is decided to be satisfied and branching is executed, and when this code does not coincide with the condition, the condition is decided not to be satisfied, and branching is not executed. Therefore, a conditional branch instruction is commonly used for executing the process for causing the branch of the processing flow after the condition decision as in step S404 in the flowchart of FIG. 4.

Although the conditional branch instruction which is required in a case where the processing as shown in FIG. 4 is carried out has an operation which does not directly contribute the data processing, it should be described by if-then-else statements or the like. However, in this method, the execution of a micro code which processes an if statement corresponding to one conditional branch requires several execution cycles, and this should be repeated by the number of data. Further, in a system LSI in which a pipeline control is exerted on a program, the flow of pipeline is interrupted, resulting in an increased overhead of the processing.

In order to prevent such a reduction in the processing performance, there are some models including an instruction which is called a conditional arithmetic instruction in the instruction set. According to this conditional arithmetic instruction, a similar condition to that of the branch instruction is added to various instructions, then only when the specified condition is satisfied, this instruction is executed, and when this condition is not satisfied, the operation directly proceeds to the next step without executing the specified operation. When this instruction is included, the conditional branch instruction as in step S404 of FIG. 4 can be excluded from the program, whereby the reduction in the processing performance can be avoided.

When this conditional arithmetic is to be performed to a large amount of data, it is previously operated whether each of the data satisfies the condition or not, the result is retained separately in a mask register as a flag, and then it is decided whether the arithmetic is to be performed or not with referrinq to this flag. However, this flag computing as the preprocessing incurs the overhead, and further the mask register for retaining this flag is separately required.

Further, as an improved one including this type of conditional arithmetic instructions, Japanese Published Patent Application No. Hei. 08-305563 discloses a data processor in which a small number of bits are added to arithmetic instruction data to select whether the arithmetic instruction is executed without reservation, when a condition is "true", or when the condition is "false", thereby avoiding a reduction in the performance according to types of the conditional arithmetic instruction or due to restrictions on flexibility in operands, whereby the capacity of a program memory can be reduced.

When a large amount of data such as image data are to be subjected to the processing in which when an arithmetic target data is zero "1" is added to the arithmetic target data in the process A, and when the arithmetic target data is not zero the operation proceeds directly to the next process, this situation should be coped with by the prior art arithmetic method or arithmetic unit by using either the method of describing the flow shown in FIG. 4 by the micro codes corresponding to the if-then-else statements or the like to repeat this the number-of-data times, or the method of repeating a flow which is obtained by excluding step S404 from the flow the number-of-data times with using the conditional arithmetic instruction. However, in these methods, the instruction cannot be subjected to the vector arithmetic process, and accordingly the repeat processing which is repeated the number-of-data times using a loop is required, thereby increasing the overhead in the processing.

Usually, there may be few programs in which processing modules which perform the above-mentioned conditional arithmetic frequently appear. However, in a processing module like a image CODEC signal processing, a prescribed processing routine is often executed repeatedly for enormous amounts of data, and when the number of steps included in the processing routine is increased or decreased even by one step, the processing performance is greatly affected.

The present invention is made in view of the above-mentioned circumstances, and its object is to provide a conditional vector arithmetic method and a conditional vector arithmetic unit, which can subject conditional arithmetic to a vector arithmetic process when a processing by a processing routine including the above-mentioned conditional arithmetic is carried out for a large amount of data, requires no separate mask register, reduces the overhead in a processing which is required for a repeat processing, and increases the processing performance.

DISCLOSURE OF THE INVENTION

To attain the above-mentioned object, a conditional vector arithmetic method according to claim 1 of the present invention comprises: an arithmetic decision step of, when an arithmetic processing target data is obtained in an arithmetic processing step of executing an arithmetic processing, computing and deciding in parallel therewith whether the arithmetic is to be executed or not; and an arithmetic control step of, when an arithmetic control is exerted to execute vector arithmetic in the arithmetic processing step, exerting the arithmetic control so as to execute the arithmetic for the arithmetic processing target data and output a result of the arithmetic or output the target data without executing the arithmetic, according to a decided result in the arithmetic decision step, thereby enabling conditional arithmetic to be processed by vector arithmetic.

According to these processing steps, the conditional arithmetic can be divided into the processing for deciding whether arithmetic is to be performed or not and controlling whether the arithmetic is executed or not according to the decided result, and the arithmetic processing for outputting either a result of the arithmetic or the input data itself which has not been subjected to the arithmetic according to the processing, these processings can be performed in parallel, and the flow of the data takes the same path whether the arithmetic is performed or not. Therefore, the conditional arithmetic is enabled to be performed without interrupting the flow of the pipeline processing, and can be executed by the vector arithmetic at high speed.

To attain the above-mentioned object, a conditional vector arithmetic method according to claim 2 of the present invention comprises a pipeline processing including: a first stage having a source data supply processing step of starting supply of data in accordance with issue of a vector arithmetic instruction, and a state flag retain processing step which is executed in parallel with said step, of sequentially retaining a state of a data which is supplied to a prescribed source among the data which are supplied in the source data supply processing, and outputting the state as a state flag; a second stage having an arithmetic processing step of performing arithmetic using the data which are supplied in the source data supply processing step and outputting an arithmetic result, and a condition decision processing step which is executed in parallel with said step, of making a condition decision of the state flag with a condition which is issued in accordance with the vector arithmetic instruction, and providing information as to whether the condition is satisfied or not to a control processing step; and a third stage having an arithmetic result storage processing step of successively storing the arithmetic results which are obtained in the arithmetic processing step, to exert a control for executing a vector arithmetic processing by executing the pipeline processing, and the control processing step of exerting a control so as to execute the arithmetic processing when the information which is output in the condition decision processing indicates that the condition is satisfied, and output the data which is supplied to the prescribed source among the data which are supplied in the source data supply processing step as it is as the arithmetic result of the arithmetic processing when the information indicates that the condition is not satisfied.

According to these processing steps, with regard to the data which are successively supplied in the source data supply processing in the vector instruction format, the property of the data (for example, whether the data is zero or not) is output as the state flag in the first stage of the pipeline, the condition decision is made using the output of the state flag and the condition which is issued by the instruction in the condition decision processing step in the second stage, and the decided result is enabled to be used for controlling the arithmetic processing. To be more specific, the conditional arithmetic is divided into the pipeline stages of condition decision and condition branch arithmetic, whereby the conditional arithmetic can be processed in the vector arithmetic format. Therefore, when this conditional vector arithmetic is applied to the conventional processing flow as shown in FIG. 4, steps S401, S403, S404 and S405 are processed in the pipeline processing. Accordingly, when a large amount of data are processed successively, the iterative routine is dispensed with, whereby the processing performance is increased. In addition, no separate mask register is required, and the previous flag decision is required neither.

To attain the above-mentioned object, a conditional vector arithmetic unit according to claim 3 of the present invention comprises: an arithmetic means for executing an arithmetic processing; an arithmetic decision means for, when the arithmetic means obtains an arithmetic processing target data, computing and deciding in parallel therewith whether the arithmetic is to be executed or not; and an arithmetic control means for, when the arithmetic means exerts an arithmetic control to execute vector arithmetic, exerting an arithmetic control so as to execute the arithmetic for the arithmetic processing target data and output a result of the arithmetic or output the data without executing the arithmetic, according to a decided result of the arithmetic decision means, thereby enabling the conditional arithmetic to be processed by the vector arithmetic.

According to this structure, the conditional arithmetic can be divided into the processing for deciding whether arithmetic is to be performed or not and controlling whether the arithmetic is executed or not according to the decided result, and the arithmetic processing for outputting either a result of the arithmetic or the input data itself which has not been subjected to the arithmetic according to the processing, these processings can be performed in parallel, and the flow of the data takes the same path whether the arithmetic is performed or not. Therefore, the conditional arithmetic is enabled to be performed without interrupting the flow of the pipeline, and can be executed by the vector arithmetic at high speed.

To attain the above-mentioned object, a conditional vector arithmetic unit according to claim 4 of the present invention comprises: a source data supply means for starting supply of first to N-th source data (N is an integer which is equal to or larger than 2) in accordance with issue of a vector arithmetic instruction; first to N-th registers for temporarily retaining the first to N-th source data which are supplied from the source data supply means; an arithmetic means for performing arithmetic using outputs of the first to N-th registers; a pipeline register for temporarily retaining an arithmetic result which is output by the arithmetic means; an arithmetic result storage means for successively storing outputs of the pipeline register; a state flag retain means for sequentially retaining state flag information which indicates a property of a predetermined source data among the first to N-th source data; a condition decision means for outputting information which indicates whether a condition of the vector arithmetic instruction is satisfied or not, on the basis of an output of the state flag retain means and condition information which is specified by the vector arithmetic instruction; and a control means for generating a control signal for executing the vector arithmetic instruction by a pipeline processing comprising a first stage in which the source data supply means supplies the source data and stores the data in the first to N-th registers and, in parallel therewith, the state flag retain means retains the state flag information and outputs the same, a second stage in which the arithmetic means outputs arithmetic processing results of the outputs of the first to N-th registers to the pipeline register and, in parallel therewith, the condition decision means outputs the information indicating whether the condition of the vector arithmetic instruction is satisfied or not, and a third stage in which the outputs of the pipeline register are stored in the arithmetic result storage means, and generating a mode selection signal for, upon receipt of the information which is output by the condition decision means, outputting a value of the prescribed source data among the first to N-th source data as it is as the output of the arithmetic means when the condition is not satisfied, and selecting the arithmetic result of the arithmetic means to output the same when the condition is satisfied.

According to this structure, with regard to the data which are supplied successively from the source data supply means in the vector instruction format, the property of the data (for example, whether the data is zero or not) is stored in the state flag retain means in the first stage of the pipeline, and the condition decision of the output of the state flag retain means with the condition issued by the instruction is made by the condition decision means in the second stage, whereby the decided result is enabled to be used for the control of the arithmetic means. To be more specific, the pipeline stage of condition decision and condition branch arithmetic is divided into separate pipeline stages, whereby the conditional arithmetic can be processed in the vector arithmetic format. Therefore, when this conditional vector arithmetic is applied to the conventional processing flow as shown in FIG. 4, step S401, S403, S404 and S405 can be processed in the pipeline processing. Accordingly, when a large amount of data are successively processed, the iterative routine is dispensed with, whereby the processing performance is increased. In addition, no separate mask register is required, and the overhead which is required for the previous flag decision is not incurred.

BRIEF DESCRIPTION OF THE DRAWINGS

FIG. 1 are block diagrams illustrating a conditional vector arithmetic unit according to a first embodiment of the present invention.

BEST MODE FOR CARRYING OUT THE INVENTION

Hereinafter, an embodiment of the present invention will be described with reference to FIGS. 1 to 3.

Embodiment 1

According to the first embodiment, the property of data which are to be subjected to an arithmetic process is decided to control whether the arithmetic is to be performed or not according to the property of the data, thereby enabling conditional arithmetic to be incorporated into a pipeline processing, i.e., a vector arithmetic processing in which a process of dividing series of processes into plural stages, executing the first stage of a series of processes and, while the second stage is executed after the completion of the first stage, executing the first stage of the next series of processes in parallel with the execution of the second stage, . . . is repeated incessantly, whereby the processing performance is increased.

Figure 1B:
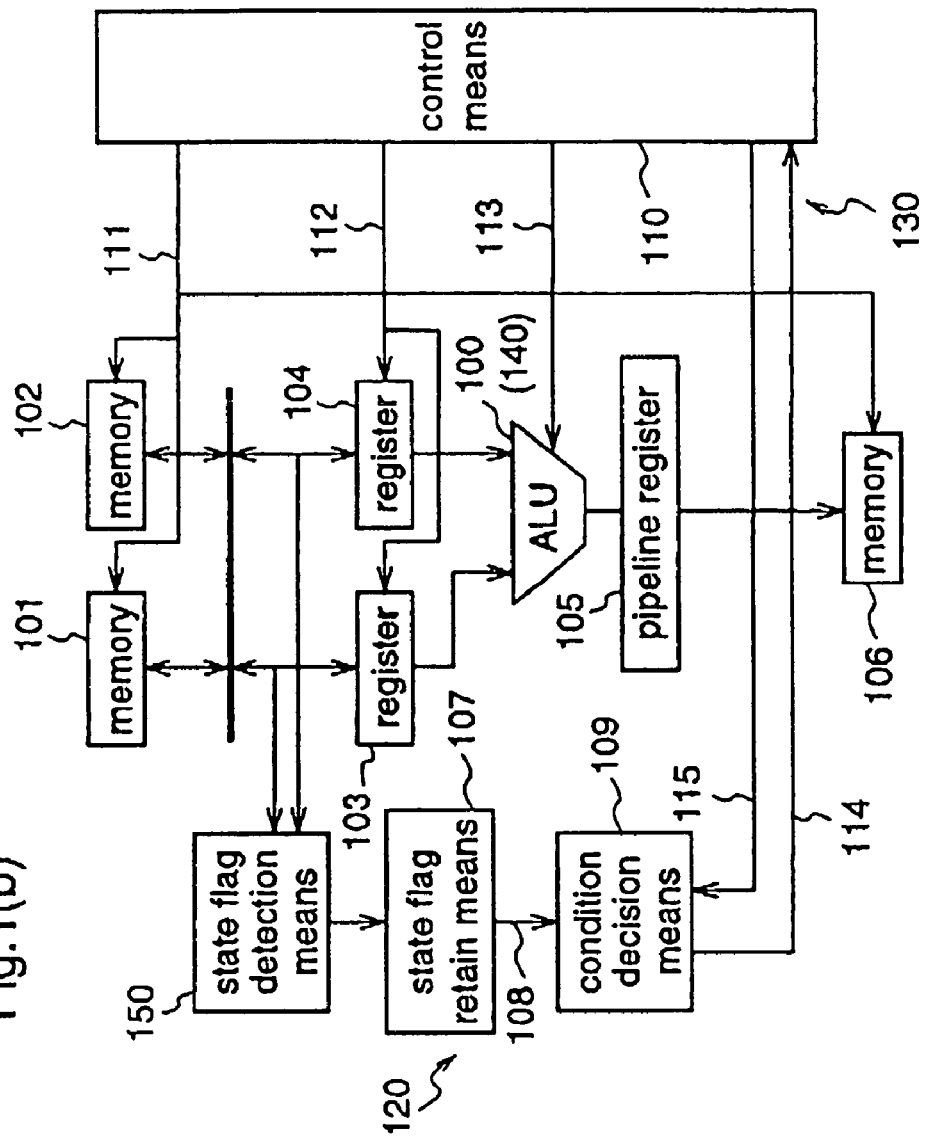
FIG. 1(b) is a block diagram illustrating a conditional vector arithmetic unit according to the first embodiment of the present invention.
Figure 1A:
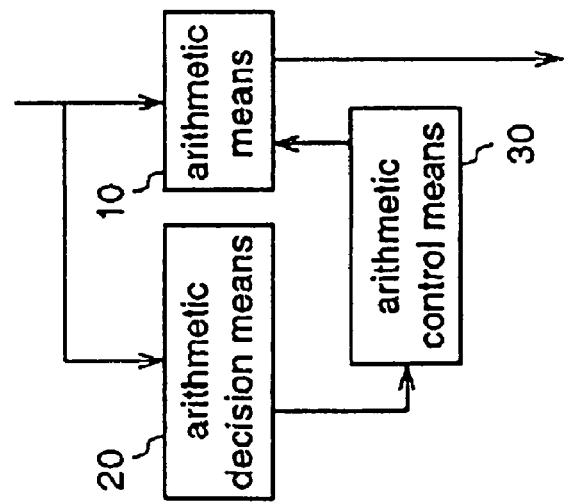
FIG. 1(a) is a diagram illustrating a structure corresponding to claim 3 of the present invention.

FIG. 1(a) is a diagram schematically illustrating a structure of a conditional vector arithmetic unit according to the first embodiment of the present invention.

In FIG. 1(a), numeral 10 denotes an arithmetic means for executing an arithmetic processing. Numeral 20 denotes an arithmetic decision means for computing and deciding whether the arithmetic is performed or not in parallel with the process by the arithmetic means 10, when the arithmetic means 10 obtains an arithmetic processing target data. Numeral 30 denotes an arithmetic control means for controlling arithmetic when the arithmetic is to be controlled so that the arithmetic means 10 performs the vector arithmetic, to perform the arithmetic for the arithmetic processing target data and output the result, or to output the data without performing the arithmetic, according to the decided result of the arithmetic decision means 20.

The arithmetic means 10, the arithmetic decision means 20 and the arithmetic control means 30 carry out processings, which correspond to an arithmetic processing step in which the arithmetic means 10 executes the arithmetic processing, an arithmetic decision step in which the arithmetic decision means 20 computes and decides whether the arithmetic is to be performed or not in parallel with the process for obtaining the arithmetic processing target data, and an arithmetic control step in which the arithmetic control means 30 controls the arithmetic when the arithmetic control is exerted to perform the vector arithmetic in the arithmetic processing step, to perform the arithmetic for the arithmetic processing target data and output the result, or output the data without performing the arithmetic, according to the decided result of the arithmetic decision step, respectively.

Next, the operation is described. The arithmetic means 10 obtains an arithmetic target data from a memory (not shown), and intends to carry out an arithmetic processing in accordance with arithmetic instruction for that data. At this time, the arithmetic decision means 20 computes and decides whether the arithmetic target data is to be subjected to the arithmetic processing or not, when the arithmetic means 10 obtains the data.

Then, on the basis of the decided result, the arithmetic control means 30 decides whether the arithmetic processing is to be carried out or not, and controls the arithmetic means 10 to process the data in accordance with the instruction when the data is decided to be subjected to the arithmetic, and output the data as it is without performing the arithmetic when the data is decided not to be subjected to the arithmetic.

The arithmetic control means 30 exerts the control so that the arithmetic means 10 executes the pipeline processing for a vector arithmetic instruction, i.e., stages of supply of data, arithmetic, and storage of the arithmetic result are executed in parallel, with temporally shifting the respective stages, thereby processing the vector instruction. However, as described above, the condition decision of the conditional arithmetic instruction is made in parallel with the original pipeline processing, and the flow of the data takes the same path whether the arithmetic is performed or not. Therefore, the conditional arithmetic is enabled to be processed as the vector arithmetic, thereby reducing the overhead which is incurred in a case where a large amount of data are repeatedly subjected to the arithmetic processing by the conditional arithmetic which is not processed as the vector arithmetic.

FIG. 1(b) is a diagram more specifically illustrating the structure of the conditional vector arithmetic unit according to the first embodiment.

In FIG. 1(b), numeral 100 denotes an ALU for executing an arithmetic processing in a conditional vector arithmetic unit to which the present invention is applied, corresponding to the arithmetic means 10 in FIG. 1(a). Numerals 101 and 102 denote memories as source data supply means. Numerals 103 and 104 denote registers for temporarily retaining source data which are supplied by the memories 101 and 102, respectively. Numeral 105 denotes a pipeline register for temporarily retaining an arithmetic result which is output by the ALU 100. Numeral 106 denotes a memory as an arithmetic result storage means for successively retaining output of the pipeline register 105. Numeral 150 denotes a state flag detection means for successively detecting information indicating the property of the source data which are read from the memory 101. Numeral 107 denotes a state flag retain means for successively retaining a state flag which is detected by the state flag detection means 150. Numeral 108 denotes a state flag which is output by the state flag retain means 107. Numeral 120 denotes an arithmetic decision means comprising the state flag detection means 150 and the state flag retain means 107, which corresponds to the arithmetic decision means 20 in FIG. 1(a), and computes and decides when the arithmetic means obtains the arithmetic processing target data, whether the arithmetic is to be executed or not in parallel with this process.

Numeral 109 denotes a condition decision means for receiving the state flag 108 and condition information 115 (described later), and deciding a condition to output information 114 indicating satisfaction/dissatisfaction of the condition. Numeral 110 denotes a control means for generating a control signal to exert a pipeline control for the entire arithmetic unit of the present invention in a vector instruction format upon receipt of an issued vector arithmetic instruction. Numeral 130 denotes an arithmetic control means comprising the condition decision means 109 and the control means 110, which corresponds to the arithmetic control means in FIG. 1(a), and exerts an arithmetic control when the arithmetic control is exerted so that the arithmetic means performs the vector arithmetic, to perform arithmetic for the arithmetic process target to output the result, or output the data without performing the arithmetic, according to the decided result of the arithmetic decision means. The ALU 100 operates as an arithmetic means 140 which performs arithmetic for the arithmetic processing target data to output the result, or outputs the data without performing the arithmetic, in accordance with the control of this arithmetic control means 130. Numeral 111 denotes a memory control signal for the memories 101, 102, and 106, which are output by the control means 110. Numeral 112 denotes a right enable signal for the registers 103 and 104, which is output by the control means 110. Numeral 113 denotes a signal for selecting the mode of the ALU 100, which is output by the control means 110. Numeral 114 denotes the information which is output by the condition decision means 109, indicating whether the condition is satisfied or not. Numeral 115 denotes condition information in accordance with the instruction which is output by the control means 110.

Figure 2:
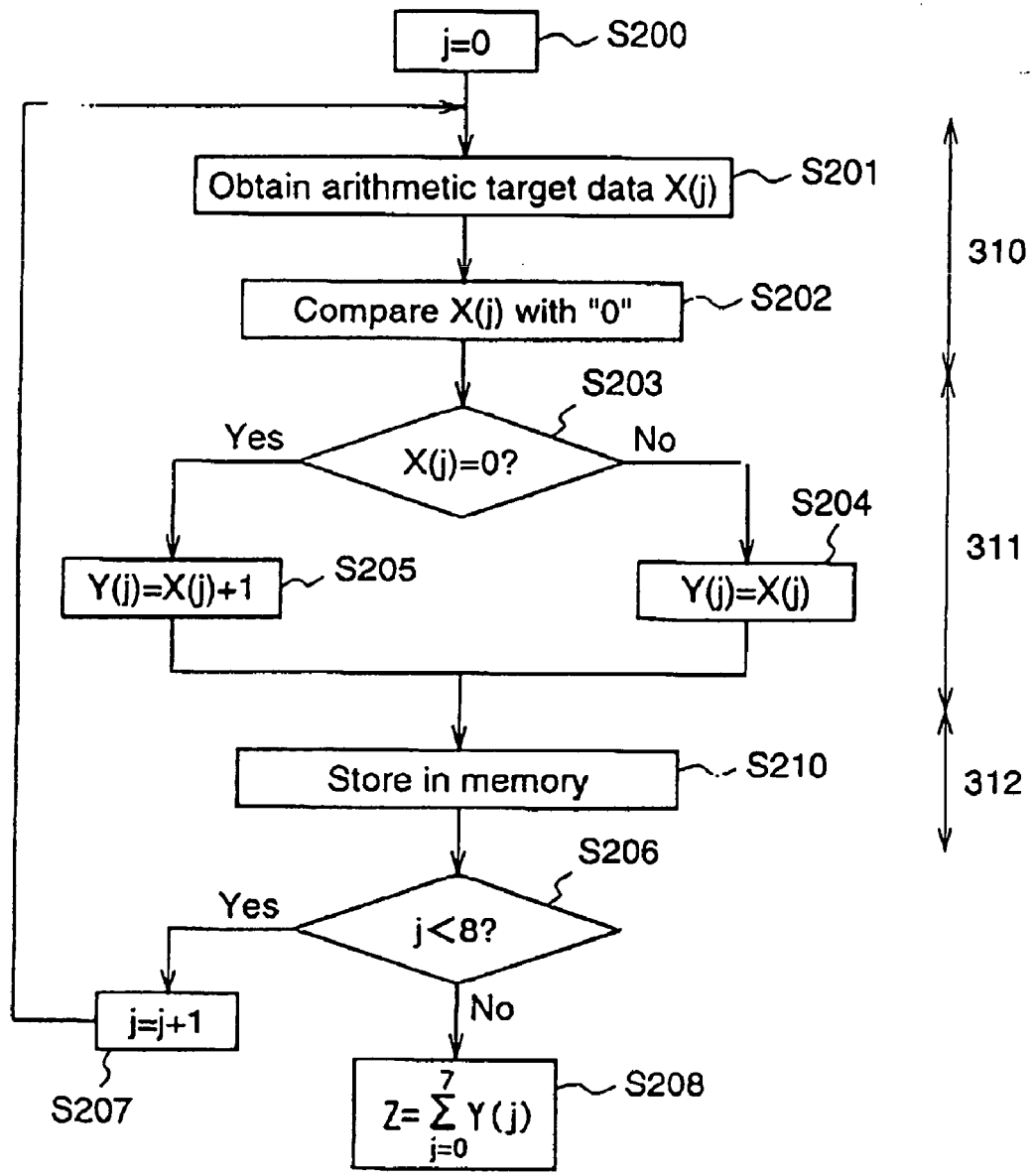
FIG. 2 is a flowchart for explaining a processing according to the first embodiment of the present invention.

The operation of the conditional vector arithmetic unit having the structure according to the first embodiment is described, taking a case where a processing as shown in a flowchart of figure 2 is carried out as an example.

In FIG. 2, initially in step S200, j is initialized to "0". Then in step S201, a arithmetic target data X(j) is obtained from the memory 101, from the state where j is initialized to "0". This step S201 corresponds to the source data supply process. Then in step S202, a process for comparing the data X(j) with zero is carried out to confirm whether the data X(j) which has been obtained in the previous step S201 is zero or not, and the result of the comparison is retained. This step S202 corresponds to the state flag retain processing step. Practically, these steps S201 and S202 are carried out in parallel, and a first stage 310 for reading the arithmetic target data from the memory 101 in FIG. 1(b) is constituted by these steps S201 and S202. The first stage 310 corresponds to the arithmetic decision step.

Then, in step S203, the conditional arithmetic instruction is used, and when it is known from the condition flag which has been decided in the previous step S202 that the comparison result shows the noncoincidence (No), X(j) is directly output as Y(j) in step S204. When the comparison result shows the coincidence (Yes), a value which is obtained by adding "1" to X(j) is output as Y(j) in step S205. Then, the operation proceeds to step S210 Practically, these step S203 and step S204 or S205 are carried out in parallel, and a second stage 311 for carrying out the arithmetic processing is constituted by these step S203 and step S204 or S205. This second stage 311 corresponds to the arithmetic processing step and the arithmetic control step. Step S203 corresponds to the condition decision step, and steps S204 and S205 correspond to the arithmetic processing step, respectively.

Then, in step S210, the arithmetic result which has been obtained as described above is stored in the memory 106, and the operation proceeds to step S206. A third stage 312 for writing the arithmetic result into the memory 106 is constituted by this step S210, and this corresponds to the arithmetic result storage processing step.

Step S206 is a step for repeating the processes of steps S201 to S205 until the processing for 8 pieces of data as the arithmetic target data has been finished. When j is smaller than "8" (Yes) in step S206, "1" is added to j in step S207, and the process of step S201 and later steps are repeated. By these steps S206 and S207, the control processing step which comprises the pipeline processing having the first stage 310 to the third stage 312 and in which the control for executing the vector arithmetic processing is exerted by executing the pipeline processing, as well as the control is exerted to execute the arithmetic processing when the information output by the condition decision processing indicates that the condition is satisfied, and directly output data which are supplied to a predetermined source among the data which are supplied by the source data supply process as the arithmetic result of the arithmetic processing when the information indicates that the condition is not satisfied is realized. Further, when j is equal to or larger than "8" (No), accumulation of values of Y(0) to Y(7) is performed in step S208.

This flowchart shows the case where the similar conditional arithmetic is performed for 8 pieces of arithmetic target data by performing the condition branch on the basis of whether the value of the arithmetic target data which is indicated by X(j) is "0" or not, adopting X(j) itself as the arithmetic result Y(j) when the value is other than "0" (No), and adopting X(j)+1 as Y(j) when the value is "0" (Yes), respectively, and repeating the above-mentioned processes until j reaches "8".

Figure 3:
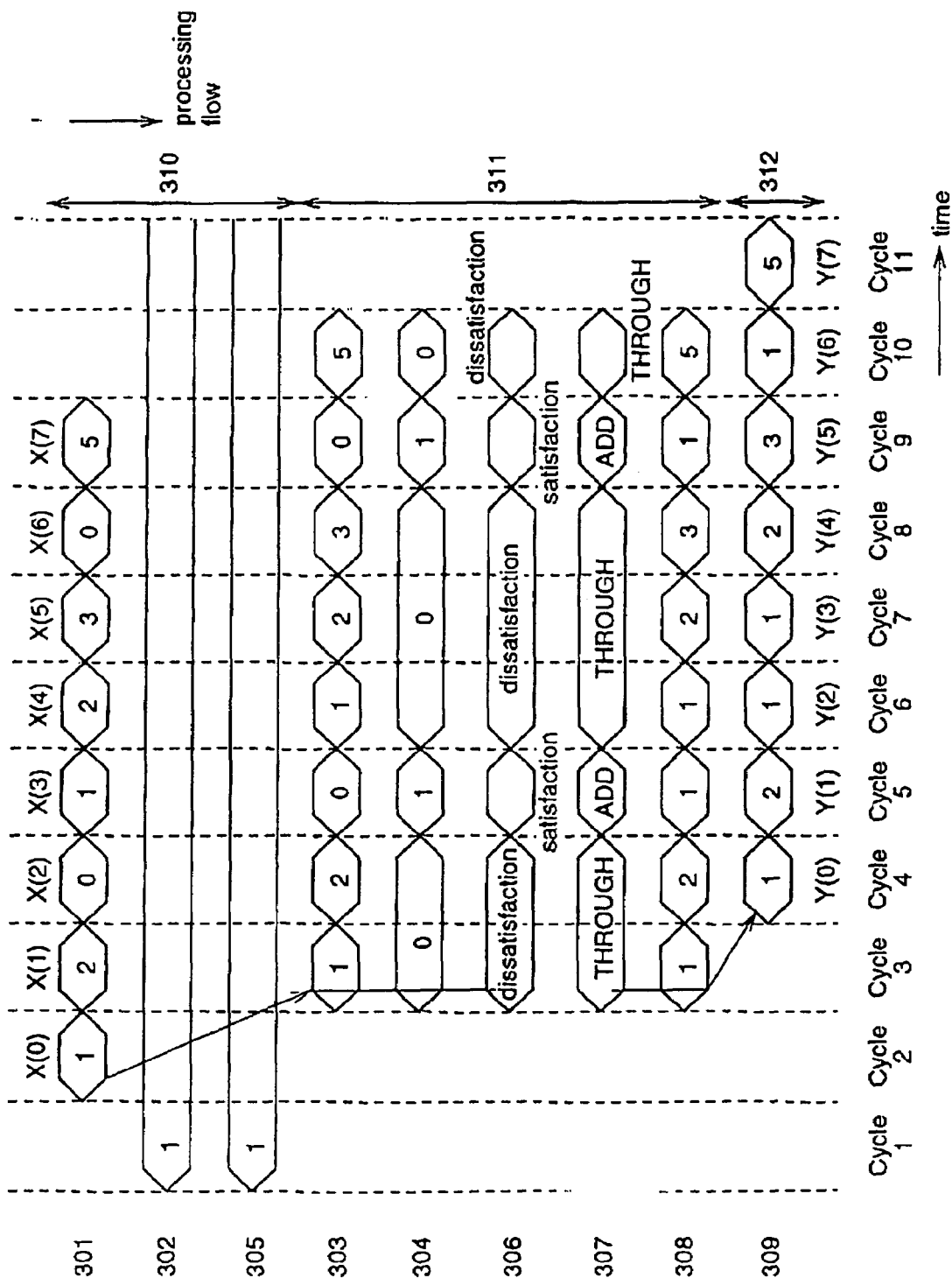
FIG. 3 is a timing chart showing a case where the processing shown in the flowchart of FIG. 2 according to the first embodiment is carried out using the conditional vector arithmetic unit according to the first embodiment.
Figure 4:
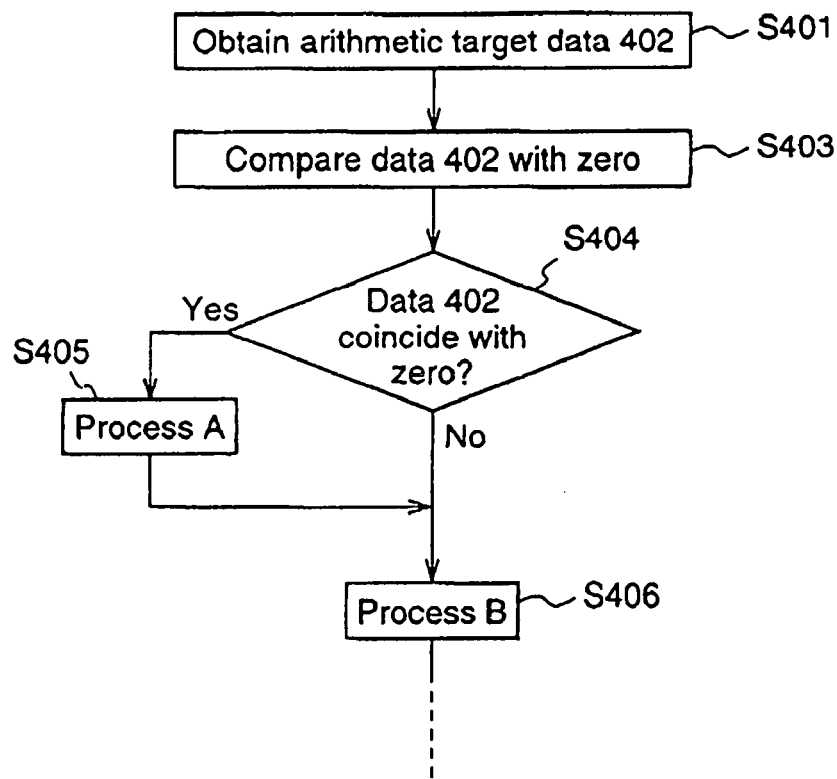
FIG. 4 is a flowchart for explaining a processing including conventional conditional arithmetic.

A timing chart in a case where the conditional vector arithmetic is performed in the above-mentioned processes using the structure according to the first embodiment is shown in FIG. 3.

In FIG. 3, numeral 301 denotes read data from the memory 101 as first source data. Numeral 302 denotes a fixed value "1" which is set in the register 104 as second source data. Numeral 303 denotes the output of the register 103. Numeral 304 denotes a state flag 108 as the output of the state flag retain means 107. Numeral 305 denotes a value indicating the condition information 115 in accordance with the instruction. Numeral 306 denotes the information 114 indicating whether the condition is satisfied or not as the output of the condition decision means 109. Numeral 307 denotes the signal 113 for selecting the mode of the ALU 100. Numeral 308 denotes the output of the ALU 100. Numeral 309 denotes the output of the pipeline register 105.

In addition, numerals 310, 311 and 312 denote the above-mentioned first, second and third stages. That is, numeral 310 denotes the first stage as the source data supply process for starting the supply of source data in accordance with the issue of the vector arithmetic instruction. Numeral 311 denotes the second stage as the arithmetic process for performing the arithmetic with using the data which are supplied by the source data supply process to output the arithmetic result. Numeral 312 denotes the third stage as the arithmetic result storage process for successively storing the arithmetic result. The control means 110 shown in FIG. 1 generates the control signal to execute the first stage 310, the second stage 311 and the third stage 312 as the pipeline processing.

Here, the state flag 304 in FIG. 3 is information indicating the data property of the first source data 301. The value "1" is output when the data is "0", and the value "0" is output when the data is other than "1", respectively. Further, as the condition information 305 in accordance with the instruction, assume that a condition code indicating a condition that "this is zero" is "1". When the signal for selecting the mode of the ALU 100 is "THROUGH" which indicates that the arithmetic process is not performed, the first source data 301 is output as the output 306 of the ALU 100. When "ADD" arithmetic is to be performed, a result which is obtained by adding values of the first source data 301 and the second source data 302 is output.

To be more specific, in Cycle 1 in FIG. 3, the control means 110 sets the register 104 in FIG. 1 at a value "1" as well as sets a value "1" as the condition information 305 in accordance with the instruction. Then, in Cycle 2, the control means 110 reads the value "1" from the memory 101 as X(0), and transfers the value to the register 103 and the state flag detection means 150. The state flag retain means 107 retains a result "0" which is detected by the state flag detection means 150. In Cycle 3, since the value 108 which is retained in the state flag retain means 107 is "0" and the value of the condition information 115 in accordance with the instruction, which is output by the control means 110 is "1", the condition decision mean 109 compares these values, and outputs the condition satisfaction/dissatisfaction information 114 for indicating the condition is not satisfied to the control means 110. Thereby, the control means 110 outputs the ALU mode select signal 113 indicating that "THROUGH" is selected to the ALU 100. Accordingly, the ALU 100 outputs the value "1" as it is without performing any arithmetic for the output of the register 103 as the first source data. Then, in Cycle 4, the output "1" of the ALU 100 is transferred to the pipeline register 105 by the control means 110, and the output of the pipeline register 105 is written in the memory 106.

In parallel of the process of passing through the data X(0) in these Cycles 2 to 4, a data X(1) having a value "2" is processed in the same manner in Cycles 3 to 5, which are respectively shifted by one cycle from those cycles. Since the condition is not satisfied in this case either, the ALU 100 outputs the value "2" as it is.

In Cycle 4, the control means 111 reads a value "0" from the memory 101 as a data X(2), and transfers this value to the register 103 and the state flag detection means 150. The state flag retain means 107 retains a detected result "1" which is detected by the state flag detection means 150. Then, in Cycle 5, since the value 108 which is retained in the state flag retain means 107 is "1" and the value of the condition information 115 in accordance with the instruction, which is output by the control means 110 is "1", the condition decision means 109 compares these values and outputs the condition satisfaction/dissatisfaction information 114 for indicating that the condition is satisfied to the control means 110. Thereby, the control means 110 outputs the ALU mode select signal 113 indicating that the additional arithmetic is to be selected, to the ALU 100. Accordingly, the ALU 100 performs the arithmetic of adding "1" to the output "0" of the register 103 as the first source data, and outputs the added value "1". Then, in Cycle 6, the output "1" of the ALU 100 is transferred by the control means 110 to the pipeline register 105, and the output of the pipeline register 105 is written in the memory 106.

Thereafter, this pipeline operation is carried out in the same manner for data X(3), X(4), X(5), X(6) and X(7) having values of "1", "2", "3", "0", and "5", values of "1", "2", "3", "1" and "5" are obtained as the outputs of the pipeline register 105, respectively.

These operations will be described with focusing attention to the flow of the processes. In the first stage 310, the read data 301 as the first source data is obtained from the memory 101 as well as the fixed value "1" is set in the register 104 as the second source data, and the value "1" of the condition information 115 in accordance with the vector arithmetic instruction is set. Then, the read data 301 as the first source data from the memory 101 is transferred to the register 103 as well as the value is decided whether it is "0" or not by the state flag detection means 150. The state flag retain means 107 retains "0" when the value is other than "0", and retains "1" when the value is "0", respectively, as the state flag. In these processes, the transfer of the read data 301 from the memory 101 corresponds to the source data supply processing step, and the processings of the state flag detection means 150 and the state flag retain means 107 correspond to the arithmetic decision step or the state flag retain processing step.

Then, in the second stage 311, the condition decision means 109 compares the value of the state flag which is retained in the state flag retain means 107 with the value "1" of the condition information 115 in accordance with the vector arithmetic instruction, which is output by the control means 110, and outputs the condition satisfaction/dissatisfaction information 114 indicating whether the arithmetic is to be performed or not by the ALU 100 to the control means 110. The control means 110 outputs the ALU mode select signal 113 to the ALU 100 in accordance with the condition satisfaction/dissatisfaction information 114, and exerts a control so that the ALU 100 performs the arithmetic of adding the fixed value "1" as the output of the register 104 to the output of the register 103 when the condition is satisfied, and does not perform any arithmetic to the output of the register 103 and then passes through this output to output the same when the condition is not satisfied, and The output of the ALU 100 is output to the pipeline register 105. In these processes, the processing by the condition decision means 109 corresponds to the condition decision processing step, the processing of the ALU 100 corresponds to the arithmetic processing step, and the processings of the condition decision means 109 and the control means 110 correspond to the arithmetic control step.

Then, in the third stage 312, the output of the pipeline register 105 in which the output of the ALU 100 is temporarily stored is written in the memory 106 to obtain an accumulated value. The writing into the memory 106 corresponds to the arithmetic result storage processing step.

It becomes evident from the timing chart shown in FIG. 3 that the flow of the data takes the same path whether or not the arithmetic is performed for the data, whereby the conditional arithmetic can be performed without interrupting the flow of the pipeline processing. Therefore, it has become apparent that the steps for repeating steps S201 to S207 eight times in the processing which has been described with reference to the flowchart of FIG. 2 can be realized by the vector arithmetic. Accordingly, the conditional arithmetic can be included in the vector arithmetic, to which one instruction can be assigned like the normal vector arithmetic. Therefore, the pipeline processing corresponding to these Cycles 1 to 11 can be realized by one instruction. Besides, this processing can be realized by the processing quantity of (8 cycles)+(number of pipeline delay stages).

As described above, according to the first embodiment, when the processing routine includes such conditional arithmetic that arithmetic contents to be processed depend on the property of arithmetic target data, and the arithmetic target extends over many pieces of data, the conditional arithmetic is divided into the decision of the condition, the condition branch, and the pipeline stage of arithmetic, i.e., when the conditional arithmetic is performed by the ALU, it is decided whether the condition for performing the arithmetic is satisfied or not on the basis of the first source data as a source of the arithmetic, separately from a cycle for performing the arithmetic, and it is decided whether the arithmetic is to be performed or not on the basis of the decided result, whereby the conditional arithmetic is enabled to be executed in the vector arithmetic format without interrupting the flow of the processing. Accordingly, the arithmetic target data can be successively processed, and the reduction in the number of processing steps can increase the performance of the processor. In addition, separate hardware such as a mask register is dispensed with, which is more advantageous in a case where the processor is incorporated into a device having constraints on the power consumption. Further, the overhead due to previous calculation of the flag is not incurred.

In the above descriptions, the memories 101 and 102 are used as the source data supply means. However, even when one of these source data supply means is constituted by a register to supply a fixed value, the same conditional vector arithmetic unit can be realized.

Further, when the ALU 100 as the arithmetic means is constituted by an accumulation circuit, the memory 106 as the arithmetic result storage means is eliminated, and the pipeline register 105 is replaced with an accumulate register, an accumulator of the conditional vector arithmetic can be realized.

Further, as the state flag which is retained in the state flag retain means 107 which successively retains the information indicating the property of the source data, in addition to a zero flag indicating whether the value of one of the memories 101 and 102 is zero or other than zero, a sign flag indicating whether the value is positive or negative, a coincidence flag indicating whether the read data from the memories 101 and 102 coincide each other or not, a flag indicating the size relationship between the read data from the memories 101 and 102, i.e., a flag indicating the state of the size relationship between the read data from the memory 101 and the read data from the memory 102 among "$\geq$", "$\leq$", ">", and "<", or the like can be retained to use the same as the branch condition.

Figure 5:
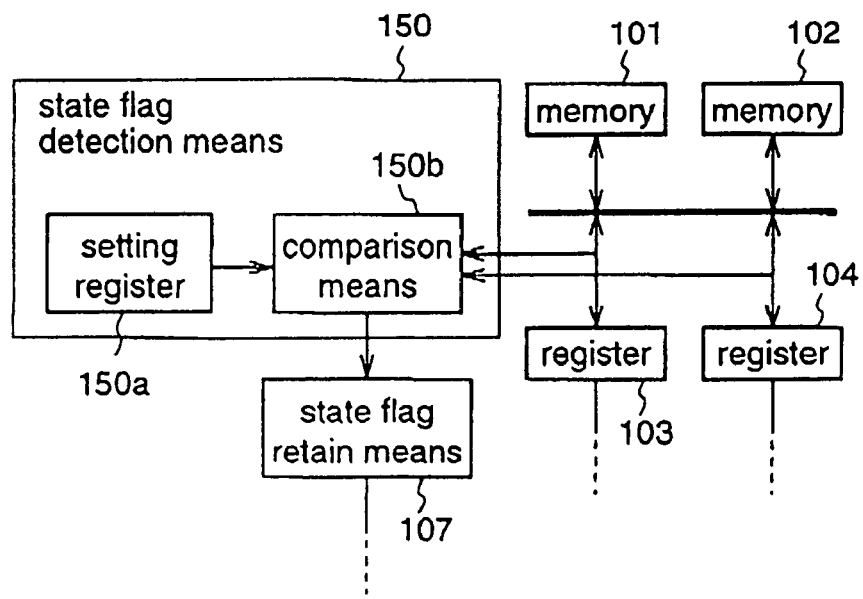
FIG. 5 is a diagram illustrating a structure of a state flag detection means shown in FIG. 1(b).

Further, as shown in FIG. 5, when the state flag detection means 150 is constituted by a setting register 150a and a comparison means 150b, a desired set value A is enabled to be input to the setting register 150a, and the comparison means 150b compares the set value A of the setting register 150a with a data which is read from one of the memories 101 and 102, the flag indicating the size relationship between these values, i.e., a flag indicating the state of the size relationship between the set value A and the data which is read from one of the memories 101 and 102 among "$\geq$", "$\leq$", ">", "<", and "=", or the like can be retained to use the same as the condition for the conditional branch.

Further, the present invention can cope with a more complicated branch condition by making the comparison logic more complicated arithmetic, as long as this can be processed within the processing time of the first stage.

Figure 6:
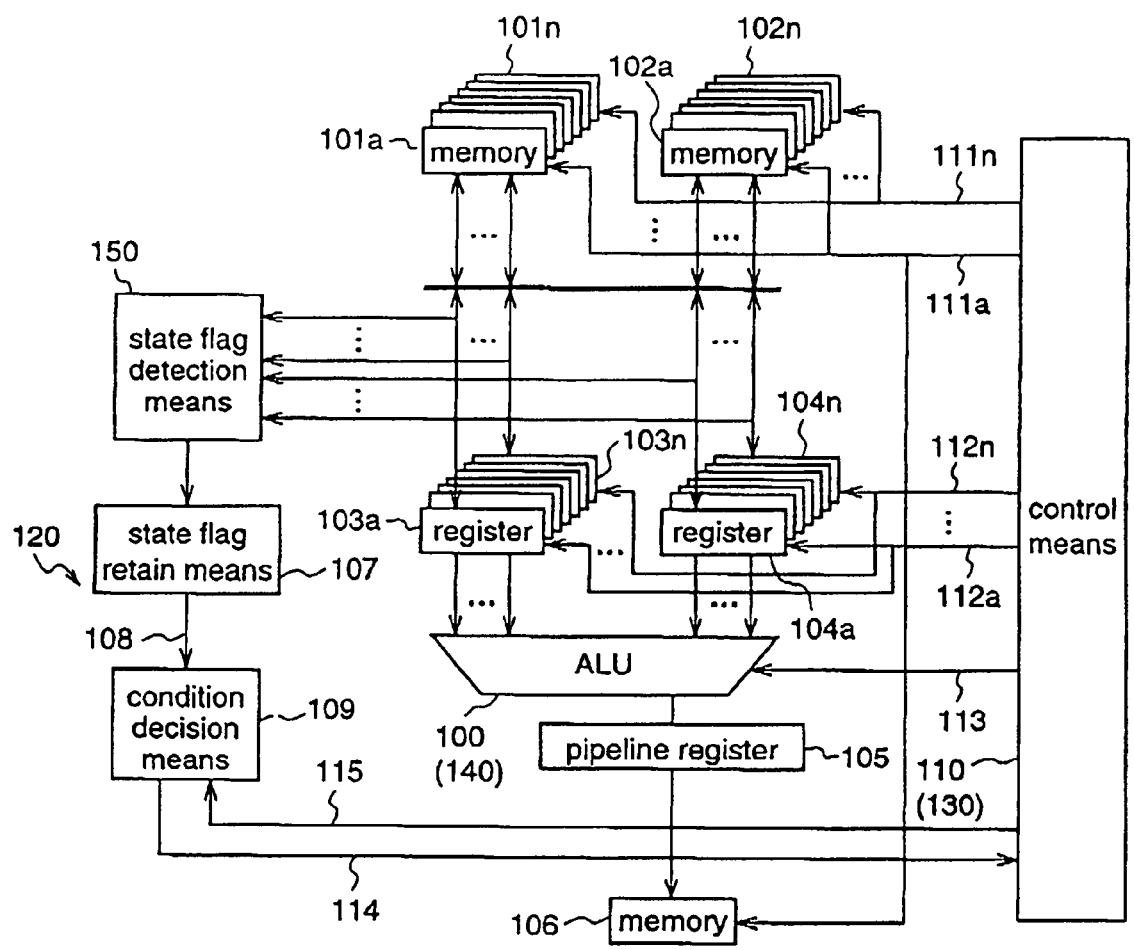
FIG. 6 is a block diagram illustrating another structure of the conditional vector arithmetic unit according to the first embodiment shown in FIG. 1(b).

When one of the memories 101 and 102 is constituted by plural memories like memories 101a to 101n or memories 102a to 102n shown in FIG. 6, then these memories 101 and 102 are used as the source data supply means, and their outputs are subjected to the arithmetic, it is possible that the output of one of the memories 101 and 102 is compared with the output of the other of the memories, and the above-mentioned various kinds of flag are retained to use the same as the condition of the condition branch. In this case, the inputs to the registers 103 and 104 and the ALU 100 should be increased according to the increase in the number of the memories. In addition, it is required to use one output of one of the memories 101 and 102 as the first source data, and compare the same with plural outputs of the other memory as second to N-th (N is an integer which is larger than 2) source data.

Further, when this is a processing module which repeatedly executes a prescribed processing routine for enormous volume of data, this can also be used for processing data other than image data.

INDUSTRIAL AVAILABILITY

According to a conditional vector arithmetic method of claim 1, when an arithmetic processing target data is obtained in an arithmetic processing step of executing an arithmetic processing, it is computed and decided in parallel therewith whether the arithmetic is to be executed or not, and when an arithmetic control is exerted to execute vector arithmetic in the arithmetic processing step, the arithmetic control is exerted so as to execute the arithmetic for the arithmetic processing target data and output a result of the arithmetic or output the target data without executing the arithmetic, according to a result of the decision. Therefore, the conditional arithmetic can be processed by The vector arithmetic, whereby it can be executed by the vector arithmetic at high speed.

According to a conditional vector arithmetic method of claim 2, a pipeline processing including: a first stage having a source data supply processing step of starting supply of data in accordance with issue of a vector arithmetic instruction, and a state flag retain processing step which is executed in parallel with this step, of sequentially retaining a state of a data which is supplied to a prescribed source among the data which are supplied in the source data supply processing, and outputting the state as a state flag; a second stage having an arithmetic processing step of performing arithmetic using the data which are supplied in the source data supply processing step and outputting an arithmetic result, and a condition decision processing step which is executed in parallel with this step, of making a condition decision of the state flag with a condition which is issued in accordance with the vector arithmetic instruction, and providing information as to whether the condition is satisfied or not to a control processing step; and a third stage having an arithmetic result storage processing step of successively storing the arithmetic results which are obtained in the arithmetic processing step is included, and in addition to a control for executing a vector arithmetic processing by executing the pipeline processing, a control processing step of exerting a control so as to execute the arithmetic processing when the information which is output in the condition decision processing indicates that the condition is satisfied, and output the data which is supplied to the prescribed source among the data which are supplied in the source data supply processing step as it is as the arithmetic result of the arithmetic processing when the information indicates that the condition is not satisfied is included. Therefore, the conditional arithmetic can be divided into the pipeline stages of condition decision and condition branch arithmetic, whereby the conditional arithmetic can be processed in the vector arithmetic format. Accordingly, when many pieces of data are processed successively, the iterative routine is dispensed with, and the processing performance is increased. In addition, separate hardware such as a mask register is not required, and the overhead due to the previous calculation of the flag is not incurred.

According to a conditional vector arithmetic unit of claim 3, when an arithmetic means obtains an arithmetic processing target data, an arithmetic decision means computes and decides in parallel therewith whether the arithmetic is to be executed or not; and when the arithmetic means exerts an arithmetic control to execute vector arithmetic, an arithmetic control is exerted so as to execute the arithmetic for the arithmetic processing target data and output a result of the arithmetic or output the data without executing the arithmetic, according to a decided result of the arithmetic decision means, whereby the conditional arithmetic is enabled to be processed by the vector arithmetic and can be executed by vector arithmetic at high speed.

A conditional vector arithmetic unit according to claim 4 comprises a source data supply means for starting supply of first to N-th source data (N is an integer which is equal to or larger than 2) in accordance with issue of a vector arithmetic instruction; first to N-th registers for temporarily retaining the first to N-th source data which are supplied from the source data supply means; an arithmetic means for performing arithmetic using outputs of the first to N-th registers; a pipeline register for temporarily retaining an arithmetic result which is output by the arithmetic means; an arithmetic result storage means for successively storing outputs of the pipeline register; a state flag retain means for sequentially retaining state flag information which indicates a property of a predetermined source data among the first to N-th source data; a condition decision means for outputting information which indicates whether a condition of the vector arithmetic instruction is satisfied or not, on the basis of an output of the state flag retain means and condition information which is specified by the vector arithmetic instruction; and a control means for generating a control signal for executing the vector arithmetic instruction by a pipeline processing comprising a first stage in which the source data supply means supplies the source data and stores the data in the first to N-th registers and, in parallel therewith, the state flag retain means retains the state flag information and outputs the same, a second stage in which the arithmetic means outputs arithmetic processing results of the outputs of the first to N-th registers to the pipeline register and, in parallel therewith, the condition decision means outputs the information indicating whether the condition of the vector arithmetic instruction is satisfied or not, and a third stage in which the outputs of the pipeline register are stored in the arithmetic result storage means, as well as generating a mode selection signal for, upon receipt of the information which is output by the condition decision means, outputting a value of the prescribed source data among the first to N-th source data as it is as the output of the arithmetic means when the condition is not satisfied, and selecting the arithmetic result of the arithmetic means to output the same when the condition is satisfied, whereby the conditional arithmetic can be divided into pipeline stages of condition decision and conditional branch arithmetic, and the conditional arithmetic can be processed in the vector arithmetic format. Accordingly, when many pieces of data are processed successively, the iterative routine is dispensed with, and the processing performance is increased. Further, separate hardware such as a mask register is required neither, and the overhead due to the previous calculation of the flag is not incurred.

What is claimed is:

1. A conditional vector arithmetic method comprising:
an arithmetic decision step of, when an arithmetic processing target data is obtained in an arithmetic processing step of executing an arithmetic process, computing and deciding in parallel with said computing whether the arithmetic process is to be executed or not; and
an arithmetic control step of, when an arithmetic control is exerted to execute vector arithmetic in the arithmetic processing step, exerting the arithmetic control to execute the arithmetic process for the arithmetic processing target data and output a result of the arithmetic process or output the target data without executing the arithmetic process, according to a decided result in the arithmetic decision step, wherein N+1-th data is being processed in said arithmetic decision step while N-th data is being processed in said arithmetic control step, said conditional vector arithmetic method thereby enabling conditional arithmetic to be processed by vector arithmetic.

2. A conditional vector arithmetic method comprising:

a pipeline processing comprising:

a first stage having a source data supply processing step of starting supply of data in accordance with issuance of a vector arithmetic instruction, and a state flag retain processing step which is executed in parallel with said source data supply processing step, of sequentially retaining a state of a data which is supplied to a prescribed source among the data which are supplied in the source data supply processing, and outputting the state as a state flag;

a second stage having an arithmetic processing step of performing arithmetic using the data which are supplied in the source data supply processing step and outputting an arithmetic result, and a condition decision processing step which is executed in parallel with said arithmetic processing step, of making a condition decision about the state flag using a condition which is issued in accordance with the vector arithmetic instruction, and providing information as to whether the condition is satisfied or not to a control processing step; and a third stage having an arithmetic result storage processing step of successively storing the arithmetic results which are obtained in the arithmetic processing step, to exert a control for executing a vector arithmetic processing by executing the pipeline processing, and the control processing step of exerting a control to execute the arithmetic processing when information which is output in the condition decision processing indicates that the condition is satisfied, and output the data which is supplied to the prescribed source among the data which are supplied in the source data supply processing step when it is the arithmetic result of the arithmetic processing when the information indicates that the condition is not satisfied.

3. A conditional vector arithmetic unit comprising:

an arithmetic means for executing an arithmetic process;

an arithmetic decision means for, when the arithmetic means obtains an arithmetic processing target data, computing and deciding in parallel with said computing whether the arithmetic process is to be executed or not; and an arithmetic control means for, when the arithmetic means exerts an arithmetic control to execute vector arithmetic, exerting an arithmetic control to execute the arithmetic process for the arithmetic processing target data and output a result of the arithmetic process or output the data without executing the arithmetic, according to a decided result of the arithmetic decision means, wherein said arithmetic decision means is for processing N+1-th data while said arithmetic control means is for processing N+1-th data, said conditional arithmetic unit thereby enabling the conditional arithmetic to be processed by the vector arithmetic.

4. A conditional vector arithmetic unit comprising:

a source data supply means for starting supply of first to N-th source data (N is an integer which is equal to or larger than 2) in accordance with issuance of a vector arithmetic instruction;

first to N-th registers for temporarily retaining the first to N-th source data which are supplied from the source data supply means;

an arithmetic means for performing arithmetic processing using outputs of the first to N-th registers;

a pipeline register for temporarily retaining an arithmetic result which is output by the arithmetic means;

an arithmetic result storage means for successively storing outputs of the pipeline register;

a state flag retain means for sequentially retaining state flag information which indicates a property of a predetermined source data among the first to N-th source data;

a condition decision means for outputting information which indicates whether a condition of the vector arithmetic instruction is satisfied or not, on the basis of an output of the state flag retain means and condition information which is specified by the vector arithmetic instruction; and a control means for generating a control signal for executing the vector arithmetic instruction by pipeline processing comprising a first stage in which the source data supply means is for supplying the source data and storing the data in the first to N-th registers and, in parallel therewith, the state flag retain means is for retaining the state flag information and outputting the same, a second stage in which the arithmetic means is for outputting arithmetic processing results of the outputs of the first to N-th registers to the pipeline register and, in parallel therewith, the condition decision means is for outputting the information indicating whether the condition of the vector arithmetic instruction is satisfied or not, and a third stage for storing the outputs of the pipeline register in the arithmetic result storage means, and generating a mode selection signal for, upon receipt of the information which is output by the condition decision means, outputting a value of the prescribed source data among the first to N-th source data when it is the output of the arithmetic means when the condition is not satisfied, and selecting the arithmetic result of the arithmetic means to output the same when the condition is satisfied.

* * * * *